(12) United States Patent
Watanabe et al.

(10) Patent No.: US 6,832,820 B2
(45) Date of Patent: Dec. 21, 2004

(54) CORE BAR OF ELASTIC BODY TRACK SHOE

(75) Inventors: Hiroaki Watanabe, Komatsu (JP); Kazutoshi Hori, Komatsu (JP); Kazuo Yasojima, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/681,130

(22) Filed: Oct. 9, 2003

(65) Prior Publication Data

US 2004/0075340 A1 Apr. 22, 2004

Related U.S. Application Data

(62) Division of application No. 09/964,543, filed on Sep. 28, 2001, now Pat. No. 6,709,077.

(30) Foreign Application Priority Data

Oct. 2, 2000 (JP) .................................. P2000-301857

(51) Int. Cl.[7] .............................................. B62D 55/24
(52) U.S. Cl. ...................... 305/177; 305/157; 305/165
(58) Field of Search ................. 305/167, 169, 305/171, 173, 176, 177, 157, 165

(56) References Cited

U.S. PATENT DOCUMENTS 2,494,066 A    1/1950 Slemmons .................... 305/10
5,984,437 A    11/1999 Katoh ......................... 305/159
6,170,925 B1   1/2001 Ono ............................ 305/177

FOREIGN PATENT DOCUMENTS

| JP | 1-223086  | 9/1989  |
| JP | 4-243675  | 8/1992  |
| JP | 4-292272  | 10/1992 |
| JP | 3033674   | 2/2000  |

Primary Examiner—Russell D. Stormer
(74) Attorney, Agent, or Firm—Armstrong, Kratz, Quintos, Hanson & Brooks, LLP

(57) ABSTRACT

It is possible to achieve a light structure by making a part of a core bar thin and to prevent an elastic body from strain deforming by a smooth rib reinforcing portion from which an edge portion of the core bar does not protrude. It is possible to achieve a strength even when piercing a hole in the core bar and to prevent the elastic body from being cut by an edge portion of a hole. Accordingly, in a core bar (10) of an elastic body track shoe fastened to each pair of joint links of a crawler by bolts, recess portions (1a, 1b) formed in a substantially inverse-trapezoidal shape or recess portions (10a, 10b) formed in a substantially inverse-trapezoidal shape toward front end portions are formed in non-grounded surface sides of right and left wing portions in a direction of a crawler width. A recess portion (1e) formed in a substantially inverse-trapezoidal shape or a through hole (1f) may be formed in a center portion.

1 Claim, 7 Drawing Sheets

CORE BAR OF ELASTIC BODY TRACK SHOE

This application is a Division of Ser. No. 09/964,543 filed Sep. 28, 2001, now U.S. Pat. No. 6,709,077.

FIELD OF THE INVENTION

The present invention relates to a core bar inserted to an elastic body of an elastic body track shoe used for an endless rubber crawler in a construction machine or the like.

BACKGROUND OF THE INVENTION

An endless rubber crawler structured such that elastic body track shoes having core bars inserted to elastic bodies such as rubbers or the like are mounted at a predetermined interval via a pair of joint links and connection pins in a circumferential direction is frequently employed in a construction machine such as a hydraulic excavator or the like, and an industrial vehicle such as a crawler type conveyance vehicle or the like.

As a first conventional art of the elastic body track shoe, for example, there has been known a structure shown in FIG. 11. In FIG. 11, an elastic body track shoe 20 has an elastic body 22 such as a rubber or the like, and a core bar 21 inserted to the elastic body 22. The core bar 21 employs a reduction roll material cut in a predetermined shape, and is structured such that both end portions in a direction of width of a crawler belt (that is, both right and left wing portions) are inclined upward at a predetermined angle in a direction of a non-grounded surface and the other portions than both end portions in the direction of the crawler belt width are manufactured in the same cross sectional shape in a side view.

However, since the core bar 21 mentioned above is manufactured by the sheet material obtained by cutting the reduction roll material, there is provided the flat core bar 21 having the same thickness all around the portions except both end portions 21a and 21a in the direction of the crawler belt width which is chamfered in a manner shown in FIG. 11, and a weight thereof becomes heavy.

As a second prior art against the problem mentioned above, for example, there is a core bar for a rubber crawler disclosed in Japanese Patent No. 3033674, and FIGS. 12 and 13 are respectively inside plan view and a front elevational view of a core bar described in the publication. In accordance with the publication, thick portions 34 and 34 extending in a longitudinal direction of a core bar 31 are formed in front end portions of right and left wing portions 33 and 33 of the core bar 31, and there are disclosed a matter that a rib reinforcing effect is achieved by increasing a thickness of the thick portions 34 and 34 so as to form the core bar 31 in a shape protruding upward from the surface, a matter that a strength of a core bar is increased by forming the rib so as to achieve a light structure, and a matter that a plurality of hole portions 32 and 32 are provided in the right and left wing portions 33 and 33 for the purpose of improving an adhesion property between the core bar 31 and the rubber elastic body so as to achieve a light structure.

However, in the core bar for the rubber crawler disclosed in the publication, there is a problem that in a core bar lightening means forming the rib by protruding upward the front end portion of the core bar 31 from the surface and having an increased strength, an elastic deformation of the rubber elastic body adhered to the core bar 31 is restricted in a freedom of deformation at the portion of the protruded upward rib, and an elastic strain is concentrated so as to quicken a fatigue crack of the rubber elastic body.

Further, in the core bar lightening means having a hole pierced in the core bar 31, since a plurality of hole portions 32 and 32 are provided in both wing portions 33 and 33 of the core bar 31, there are problems that a strength of the core bars in both wing portions 33 and 33 is reduced and the rubber elastic body deformed due to the applied weight is in contact with an edge of the hole so as to be easily cut.

SUMMARY OF THE INVENTION

The present invention is made by taking into consideration a matter that a strength required in each of portions of a core bar is not uniform in all around the portions and a matter that the core bar is rigidly integrated via a crawler belt connection link and a link connection pin. Further, an object of the present invention is to provide the core bar of an elastic body track shoe structured such as to achieve a light structure by making a stress excess portion in the core bar thin, prevent an elastic body from strain deforming by forming a smooth rib reinforcing portion in which an edge portion of the core bar does not protrude from a core bar surface, secure a strength even when a hole is pierced in the core bar, and make the elastic body not be cut by an edge portion of the hole.

In order to achieve the object mentioned above, in accordance with a first aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape are formed in non-grounded surface sides of right and left wing portions in a direction of a crawler width.

In accordance with the first aspect, since the recess portions are formed in the right and left wing portions of the core bar, it is possible to achieve a light structure and it is possible to reduce a manufacturing cost. Further, since the recess portions are formed in the non-grounded surface sides while grounded surface sides of the right and left wing portions are kept in the flat surfaces, the grounded surface sides of the core bar are formed in a shape having no stress concentration, and it is possible to widely improve a durability. Further, in an outer peripheral portion of the recess portion, since a non-recess portion (having the same thickness and strength as those before forming the recess portion) is left along the direction of the crawler width in both end portions in a longitudinal direction of the crawler, it is possible to secure a necessary strength. Further, since a surface changing to the recess portion from the non-recess portion on the flat surface is formed in a smooth surface having a substantially inverse-trapezoidal shape, it is possible not only to increase an adhesive strength with respect to the elastic body but also to avoid a concentration of elastic strain.

In accordance with a second aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape open toward a front end portion are formed in non-grounded surface sides of right and left wing portions in a direction of a crawler width.

In accordance with the second aspect, since the recess portion open to the front end portion is formed in the non-grounded surface sides of the right and left wing portions in the core bar, it is possible to further lighten in comparison with the core bar in accordance with the first aspect, and it is possible to reduce a manufacturing cost. The other operations and effects are the same as those of the first invention.

In accordance with a third aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein a recess portion formed in a substantially inverse-trapezoidal shape is formed in a center portion in a direction of a crawler width.

In accordance with the third aspect of the present invention, since the recess portion is formed in the center portion in the direction of the crawler width of the core bar, it is possible to lighten the core bar, and it is possible to reduce a manufacturing cost. Further, since a pair of right and left joint links are connected to the center portion of the core bar and each pair of joint links are connected to each other by pins in an endless manner, the center portion of the core bar is structured in a box shape and a rigidity thereof is high, so that it is possible to maintain a sufficient strength even when the recess portion is provided in the center portion. Further, since the surface changing to the recess portion from the non-recess portion of the flat surface is formed in the smooth surface having the inverse-trapezoidal shape, it is possible not only to increase an adhesive strength with respect to the elastic body but also to avoid the concentration of the elastic strain.

In accordance with a fourth aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein a through hole is formed in a center portion in a direction of a crawler width.

In accordance with the fourth aspect of the present invention, since the through hole is formed in the center portion in the direction of the crawler width of the core bar, it is possible to further lighten the core bar in comparison with the third aspect, and it is possible to reduce a manufacturing cost. At this time, since a pair of joint links, the connection pin and the core bar are rigidly integrated and the center portion of the core bar is structured in the box shape as described in the third aspect, it is possible to secure a sufficient strength of the core bar even when the through hole is pieced in the center portion of the core bar. Further, in order to prevent the elastic body from deforming so as to be in contact with the edge portion of the through hole pieced in the core bar, thereby being cut, the structure is made such that a through hole is formed in a portion of the elastic body at the same position as the hole of the core bar, whereby the elastic body is not in contact, or a recess portion is formed in a grounded surface of the center portion in the elastic body so as not to be grounded, whereby an elastic deformation due to a load application is not given, so that the problem can be achieved.

Further, since a water and a muddy water are discharged from the through hole by providing the through hole in the elastic body at the same position as this through hole, thereby reducing earth and sands attached to the core bar, it is possible to improve a durability of the track shoe of the elastic body. The other operations and effects are the same as those of the third aspect.

In accordance with a fifth aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape are formed in non-grounded surface sides of right and left wing portions in a direction of a crawler width, and a recess portion formed in a substantially inverse-trapezoidal shape is formed in a center portion in the direction of the crawler width.

In accordance with the fifth aspect, the same operations and effects as those of the first and third aspects can be obtained.

In accordance with a sixth aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape are formed in non-grounded surface sides of right and left wing portions in a direction of a crawler width, and a through hole is formed in a center portion in the direction of the crawler width.

In accordance with the sixth aspect, the same operations and effects as those of the first and fourth aspects can be obtained.

In accordance with a seventh aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape open toward front end portions are formed in non-grounded surface sides of right and left wing portions in a direction of a crawler width, and a recess portion formed in a substantially inverse-trapezoidal shape is formed in a center portion in the direction of the crawler width.

In accordance with the seventh aspect, the same operations and effects as those of the second and third aspects can be obtained.

In accordance with an eighth aspect of the present invention, there is provided a core bar of an elastic body track shoe inserted to an elastic body such as a rubber or the like in the elastic body track shoe fastened to each pair of joint links of a crawler by bolts and formed in a substantially flat surface shape on both of front and back surfaces, wherein recess portions formed in a substantially inverse-trapezoidal shape open toward front end portions are formed in non-grounded surface sides of right and left wing, portions in a direction of a crawler width, and a through hole is formed in a center portion in the direction of the crawler width.

In accordance with the eighth aspect, the same operations and effects as those of the second and fourth aspects can be obtained.

BRIEF DESCRIPTION OF THE DRAWINGS

FIG. 3 is a schematic view of a core bar in accordance with a first embodiment of the present invention, in which

FIG. 5 is a schematic view of a core bar in accordance with a third embodiment of the present invention, in which

DETAILED DESCRIPTION OF PREFERRED EMBODIMENTS

A description will be given in detail of preferred embodiments of a core bar of an elastic body track shoe in accordance with the present invention with reference to the accompanying drawings.

Figure 1:
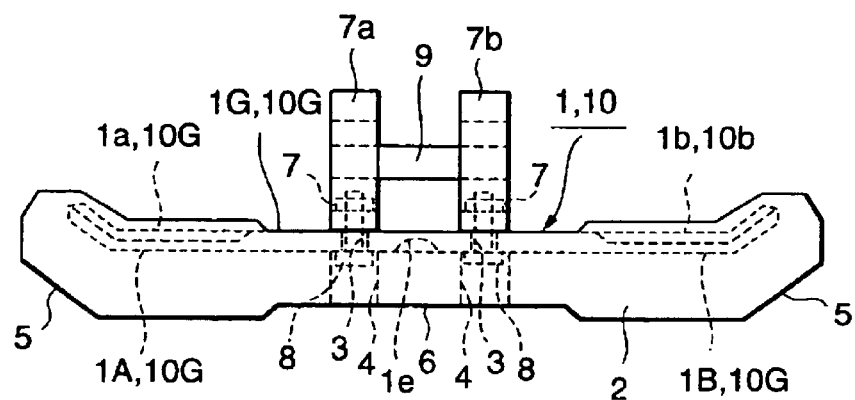
FIG. 1 is a schematic view of an elastic body track shoe in accordance with the present invention.
Figure 2:
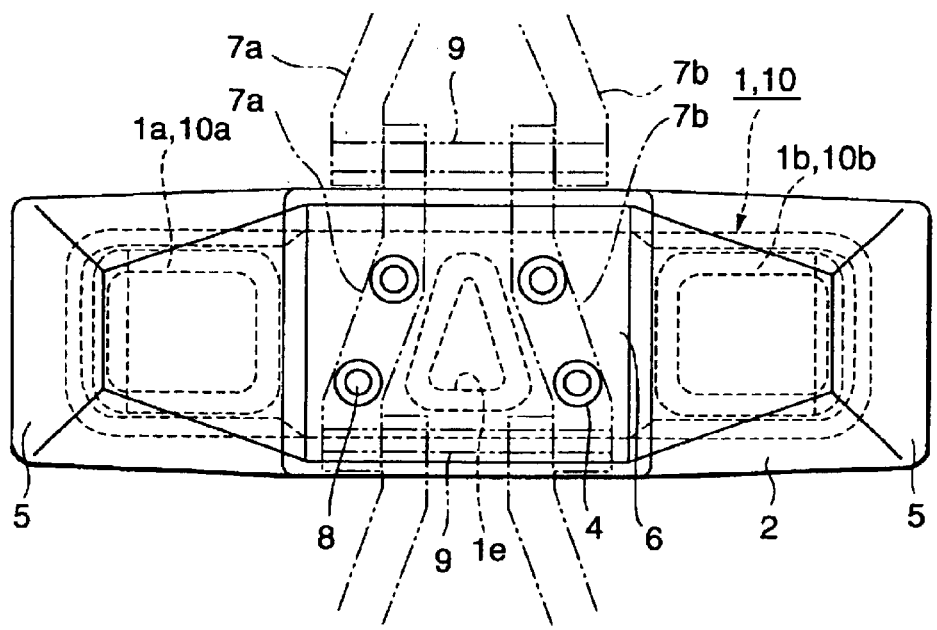
FIG. 2 is a plan view in a side of a grounded surface of the elastic body track shoe shown in FIG. 1.

At first, a description will be schematically given of an elastic body track shoe to which a core bar in accordance with the present invention is inserted with reference to FIGS. 1 and 2.

A present elastic body track shoe used in an endless rubber crawler of a construction machine such as a hydraulic excavator or the like has an elastic body 2 made of a rubber or the like and core bars 1 and 10 inserted to the elastic body 2. Center portions 1G and 10G of the core bars 1 and 10 are exposed to a side of a non-grounded surface, and the exposed surface and the non-grounded surface of the elastic body 2 are flush in end portions in a longitudinal direction. Further, a detailed description will be later given of each of embodiments. In this case, the core bars 1 and 10 inserted to the elastic body 2 are formed in a substantially flat surface in both of front and back surfaces, recess portions $1a$, $1b$, $10a$ and $10b$ are respectively formed in non-grounded surface sides of left and right wing portions 1A, 1B, 10A and 10B in the core bars 1 and 10, and a recess portion $1e$ is formed in a grounded surface side of the center portions 1G and 10G. Front end portions in a direction of a rubber crawler width of the left and right wing portions 1A, 1B, 10A and 10B are inclined upward at a predetermined angle, and both front end surface grounded surfaces in the direction of the rubber crawler of the elastic body 2 have inclined surfaces 5 and 5 in conformity with the angle of incline. The center portion of the elastic body 2 has a thickness smaller than that of both wing portions, and a grounded surface 6 of the center portion is at a position recessed to the core bar side rather than both wing portions.

Two through holes 3 are formed in each of the center portions 1G and 10G of the core bars 1 and 10 in a laterally symmetrical manner, totally four through holes 3 are formed, and through holes 4 each having a diameter larger than that of the through hole 3 is provided in a portion of the elastic body 2 at the same position as the through hole 3. A pair of left and right joint links $7a$ and $7b$ are connected by a pin 9 and plural pairs of joint links $7a$ and $7b$ are connected in the same manner, thereby constructing an endless link belt. The center portions 1G and 10G of the exposed core bars 1 and 10 are fastened and attached to the respective joint links $7a$ and $7b$ by a bolt 8 extending through the through holes 3 and 4 and a nut 7, whereby an endless rubber crawler is constructed. In this case, it is desirable that the core bars 1 and 10 are manufactured in accordance with a forging.

Next, a description will be given of first to eighth embodiments of a core bar of an elastic body track shoe in accordance with the present invention with reference to FIGS. 3 to 10.

Figure 3A:
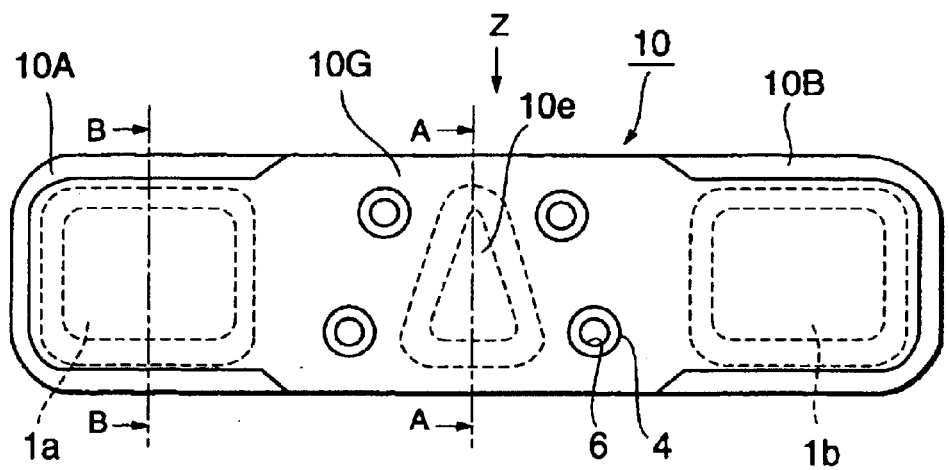
FIG. 3A is a plan view in the grounded surface side of the core bar.

A description will be given of a first embodiment of the core bar of the elastic body track shoe with reference to FIG. 3. FIG. 3A is a plan view in a grounded surface side of the core bar, FIG. 3B is a view as seen from an arrow Z in FIG. 3A, FIG. 3C is a cross sectional view along a line A—A in FIG. 3A and FIG. 3D is a cross sectional view along a line B—B in FIG. 3A.

Figure 3B:
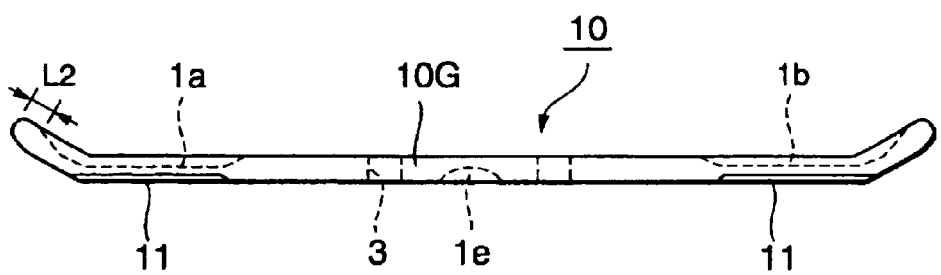
FIG. 3B is a view as seen from an arrow z in FIG. 3A.
Figure 3C:
FIG. 3C is a cross sectional view along a line A—A in FIG. 3A
Figure 3D:
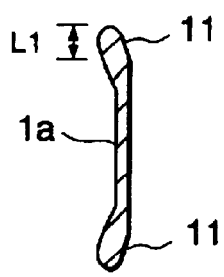
FIG. 3D is a cross sectional view along a line B—B in FIG. 3A.

As shown in FIGS. 3A, 3B and 3D, recess portions $1a$ and $1b$ formed in a substantially inverse-trapezoidal shape are respectively formed in non-grounded surface sides of the left and right wing portions 10A and 10B of the core bar 10 formed in a substantially flat surface on both of front and back surfaces. Outer peripheral portions of the recess portions 1*a* and 1*b* have non-recessed portions (that is, having the same thickness and strength as those of the conventional one) constituted by flat surfaces and having a width L1 in both end portions in a longitudinal direction of the rubber crawler as shown in FIG. 3D, and have non-recessed portions constituted by flat surfaces and having a width L2 in front end portions in a direction of the rubber crawler width (that is, an illustrated lateral direction) as shown in FIG. 3B. Further, as shown in FIG. 3D, taper portions 11 and 11 are provided along a lateral direction in lower portions in both end portions in a longitudinal direction of the left and right wing portions 10A and 10B.

Further, as shown in FIGS. 3A to 3C, a recess portion 1*e* formed in a substantially inverse-trapezoidal shape is formed on a surface in a grounded surface side of the center portion 10G in the core bar 10. In this case, a shape in a plan view of the recess portion 1*e* is not limited to a substantially triangular shape as illustrated, but may be formed in an optional shape.

Since the recess portions 1*a* and 1*b* and the recess portion 1*e* are covered by the elastic body 2 shown in FIG. 1, surfaces changing from the non-recessed portions constituted by the flat surface to these recess portions have a gentle incline formed in the substantially inverse-trapezoidal shape as shown in FIGS. 3C and 3D. In this case, the recess portion 1*e* may be formed in the grounded surface side of the center portion 10G in the core bar 10 or the non-grounded surface side.

A description will be given of an operation and an effect in accordance with the present embodiment.

In general, strengths required in the respective portions of the core bar are not uniform in all around the portions, for example, it is sufficient both end portions in a direction of a crawler belt with have a strength enough for preventing both end portions from being bent at a time of riding over a stone. Since a load of a vehicle body is not applied to the center portion via rolling wheels, a strength thereof may be made smaller than that of the other portions to which the load of the vehicle body is applied. Accordingly, since the recess portions 1*a* and 1*b* and the recess portion 1*e* are respectively formed the left and right wing portions 10A and 10B and the center portion 10G in the core bar 10 which have an excess strength with respect to an external load applied from the grounded surface side of the conventional crawler, it is possible to widely lighten the core bar 10 and it is possible to reduce a manufacturing cost.

Further, since the recess portions 1*a* and 1*b* are respectively formed in the non-grounded surface sides of the left and right wing portions 10A and 10B while the grounded surface sides thereof are kept in flat surfaces, the grounded surface sides of the core bar 10 are formed in a shape in which a stress is not concentrated, and the recess portions 1*a* and 1*b* are formed by gentle inclined surfaces, so that not only an adhesive strength between the core bar 10 and the elastic body 1 is increased and a peeling is hard to be generated, but also it is possible to avoid a stress concentration in the elastic body 2, whereby it is possible to widely improve a durability. Further, since the non-recessed portions having the predetermined width L1 are left along the lateral direction in both end portions in the longitudinal direction of the rubber crawler, it is possible to secure a necessary strength.

Further, since a pair of right and left joint links 7*a* and 7*b* are connected to the center portion 10G of the core bar 10, and the joint links 7*a* and 7*b* in each pair are connected to each other by the pin 9 in an endless manner, the center portion of the core bar is structured in a box shape so as to have a high rigidity, so that it is possible to maintain a sufficient strength even when the recess portion 1*e* is provided in the center portion 10G.

Figure 4:
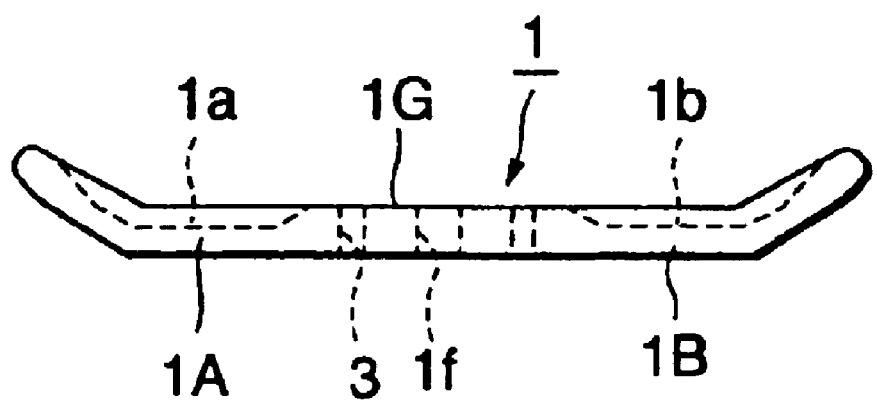
FIG. 4 is a schematic view of a core bar in accordance with a second embodiment.

Next, a description will be given of a second embodiment of a core bar of an elastic body track shoe on the basis of FIG. 4 with reference to FIG. 1. FIG. 4 is a side elevational view of a core bar in accordance with the present embodiment. In this case, the same reference numerals are attached to the same elements as those in the previously described drawings, a description will be omitted, and the same manner will be employed in the other embodiments.

In the center portion 1G of the core bar 1 formed in the substantially flat surface on both of the front and back surfaces, a through hole if is formed substantially in a center of four through holes 3. The through hole 1*f* may be covered by the elastic body 2 shown in FIG. 1 in the grounded surface side, or may be communicated with a through hole (not shown) formed at the same position in the elastic body 2. At this time, in order to prevent the elastically deforming elastic body 2 from being in contact with an edge of the through hole if, a diameter of the through hole in the elastic body 2 may be set to be larger than that of the through hole 1*f*, or the structure may be made such as to recess the grounded surface 6 (refer to FIG. 1) in the center portion of the elastic body 2 so that the center portion of the elastic body 2 does not elastically deforms due to the load application, thereby preventing the grounded surface from being grounded.

Further, the recess portions 1*a* and 1*b* formed in the substantially inverse-trapezoidal shape having the gentle inclined surfaces are respectively formed in the left and right wing portions 1A and 1B of the core bar 1 with leaving flat non-recessed portions having predetermined widths in outer peripheral portions thereof.

In accordance with the present embodiment, since the recess portions 1*a* and 1*b* and the through hole 1*f* are respectively formed in the left and right wing portions 1A and 1B and the center portion 1G of the core bar 1 having an excess strength with respect to an external load applied from the grounded surface side of the crawler, it is possible to further lighten the core bar 1 in comparison with the first embodiment and it is possible to reduce a manufacturing cost. At this time, since a pair of left and right joint links 7*a* and 7*b*, the connection pin 9 and the core bar 1 are rigidly integrated and the center portion 1G of the core bar is structured in the box shape, it is possible to secure a sufficient strength of the core bar 1 even when the through hole 1*f* is pieced in the center portion 1G of the core bar. Further, the larger through hole than the through hole 1*f* is formed in the elastic body portion at the same position as that of the through hole 1*f* of the core bar 1, or the elastic deformation due to the load application is not given to the edge of the through hole 1f by recessing the grounded surface 6 of the center portion of the elastic body so as to prevent from being grounded, whereby it is possible to prevent the elastic body from being in contact with the edge portion of the through hole 1f, thereby being cut.

Further, since the through hole 1f functions as a hole for draining a water and a muddy water by providing the through hole in the elastic body 2 at the same position as the through hole 1f of the core bar 1, thereby reducing earth and sands attached to the core bar 1, it is possible to improve a durability of the track shoe of the elastic body. The other operations and effects are the same as those of the embodiment mentioned above, and a description thereof will be omitted.

Figure 5A:
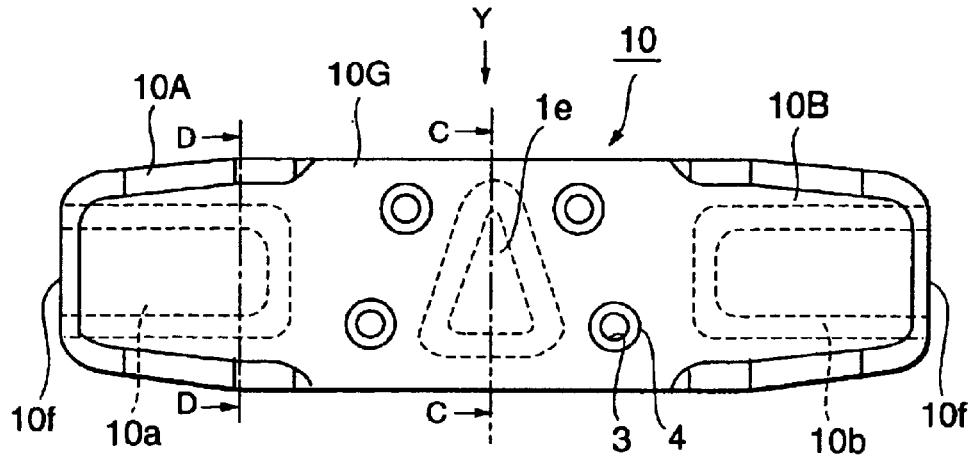
FIG. 5A is a plan view in the grounded surface side of the core bar.
Figure 5B:
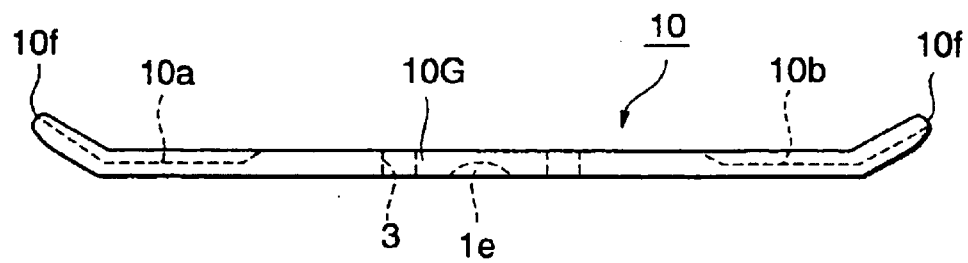
FIG. 5B is a view as seen from an arrow Y in FIG. 5A.
Figure 5C:
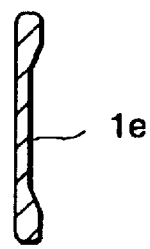
FIG. 5C is a cross sectional view along a line C—C in FIG. 5A
Figure 5D:
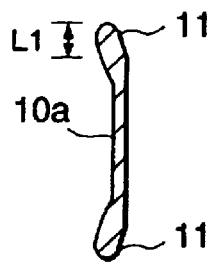
FIG. 5D is a cross sectional view along a line D—D in FIG. 5A.

Next, a description will be given of a third embodiment of a core bar of an elastic body track shoe on the basis of FIGS. 5A to 5D. FIG. 5A is a plan view in the grounded surface side of the core bar, FIG. 5B is a view as seen from an arrow Y in FIG. 5A, FIG. 5C is a cross sectional view along a line C—C in FIG. 5A and FIG. 5D is a cross sectional view along a line D—D in FIG. 5A. In this case, since the elements having the same reference numerals as those in FIGS. 3A to 3D have the same functions, a description will be omitted here, and a description will be given only of different portions.

Recess portions 10a and 10b are respectively formed in non-grounded surface sides of the left and right wing portions 10A and 10B of the core bar 10 formed in a substantially flat surface on both of front and back surfaces. The recess portions 10a and 10b are open toward front end portions 10f and 10f in the direction of the rubber crawler width. That is, the non-recessed portions are not provided in the front end portions 10f and 10f in the outer peripheral portions of the recess portions 10a and 10b. Further, non-recessed portions constituted by flat surfaces and having a width L1 are provided in both end portions in the longitudinal direction of the rubber crawler, in the outer peripheral portions of the recess portions 10a and 10b, as shown in FIG. 5D.

As shown in FIGS. 5A to 5C, the recess portion 1e formed in a substantially inverse-trapezoidal shape having a gentle inclined surface is formed on the surface in the grounded surface side of the center portion 10G in the core bar 10.

Since the recess portions 10a and 10b and the recess portion 1e are covered by the elastic body 2 shown in FIG. 1, surfaces changing from the flat non-recessed portions to these recess portions are formed in the substantially inverse-trapezoidal shape having a gentle inclined surface as shown in FIGS. 5C and 5D. In this case, the recess portion 1e may be formed in the grounded surface side of the center portion 10G in the core bar 10 or the non-grounded surface side.

In accordance with the present embodiment, since the recess portions 10a and 10b and the recess portion 1e open toward the sides of the front end portions 10f and 10f are respectively formed the left and right wing portions 10A and 10B and the center portion 10G in the core bar 10, it is possible to widely lighten the core bar 10 and it is possible to reduce a manufacturing cost. Further, since the recess portions 10a and 10b are respectively formed in the non-grounded surface sides of the left and right wing portions 10A and 10B while the grounded surface sides thereof are kept in flat surfaces, a stress concentration is not generated in the grounded surface sides of the core bar 10, and the recess portions 10a and 10b are formed by gentle inclined surfaces, so that not only a peeling between the core bar 10 and the elastic body 2 is hard to be generated, but also it is possible to avoid a stress concentration in the elastic body 2, whereby it is possible to widely improve a durability. Further, since the center portion 10G of the core bar 10 is rigidly integrated by a pair of left and right joint links 7a and 7b, the connection pin 9 and the core bar 10 so as to form a box structure, thereby having a high rigidity, it is possible to maintain a sufficient strength even when the recess portion 1e is provided.

Figure 6:
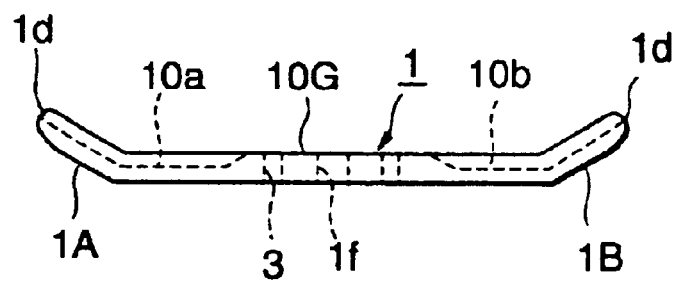
FIG. 6 is a schematic view of a core bar in accordance with a fourth embodiment.

Next, a description will be given of a fourth embodiment of a core bar of an elastic body track shoe on the basis of FIG. 6 with reference to FIG. 1. FIG. 6 is a side elevational view of the core bar in accordance with the present embodiment.

In the center portion 1G of the core bar 1 formed in the substantially flat surface on both of the front and back surfaces, a through hole 1f is formed substantially in a center of four through holes 3, as in the same manner as that in the second embodiment. Further, in order to prevent the elastically deforming elastic body 2 from being in contact with an edge of the through hole 1f, it is possible to provide with a through hole having a diameter slightly larger than that of the through hole 1f in a portion of the elastic body 2 at the same position, or the structure may be made such as to recess the grounded surface 6 (refer to FIG. 1) in the center portion of the elastic body 2, thereby preventing the grounded surface from being grounded.

Further, the recess portions 10a and 10b formed in the substantially inverse-trapezoidal shape having the gentle inclined surfaces which are open toward the front end portions 1d and 1d in the direction of the rubber crawler width are formed in the left and right wing portions 1A and 1B of the core bar 1.

In accordance with the present embodiment, since the through hole 1f is formed in the center portion 1G of the core bar 1 having an excess strength with respect to an external load applied from the grounded surface side of the crawler, it is possible to reduce a manufacturing cost. At this time, since a pair of left and right joint links 7a and 7b, the connection pin 9 and the core bar 1 are rigidly integrated and the center portion 1G of the core bar is structured in the box shape, it is possible to secure a sufficient strength of the core bar 1 even when the through hole 1f is pieced in the center portion 1G of the core bar. Further, the through hole slightly larger than the through hole 1f is formed in the elastic body portion at the same position as that of the through hole 1f, or the grounded surface 6 of the center portion of the elastic body is recessed, whereby it is possible to prevent the elastic body from being cut by the edge portion of the through hole 1f.

Further, since it is possible to reduce earth and sands attached to the core bar 1 of he elastic body track shoe by the through hole 1f, it is possible to improve a durability, of the elastic body track shoe. The other operations and effects are the same as those of the third embodiment mentioned above, and a description thereof will be omitted.

Figure 7:
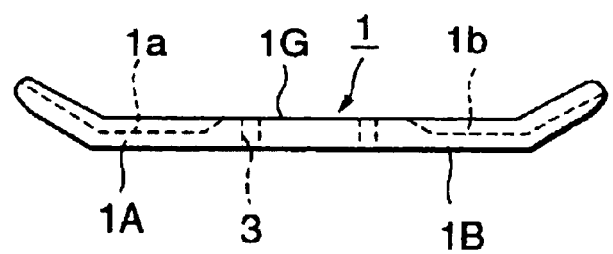
FIG. 7 is a schematic view of a core bar in accordance with a fifth embodiment.

A description will be given of a fifth embodiment of a core bar of an elastic body track shoe on the basis of FIG. 7 with reference to FIG. 1. FIG. 7 is a side elevational view of the core bar. The same recess portions 1a and 1b as those of the first embodiment are respectively formed in the left and right wing portions 1A and 1B of the core bar 1 which are formed in a substantially flat surface in both of front and back surfaces.

In accordance with the present embodiment, in the same manner as the first embodiment, it is possible to lighten the core bar, it is possible to reduce a manufacturing cost, it is possible to obtain a shape which does not generate a stress concentration, and it is possible to improve a durability.

Figure 8:
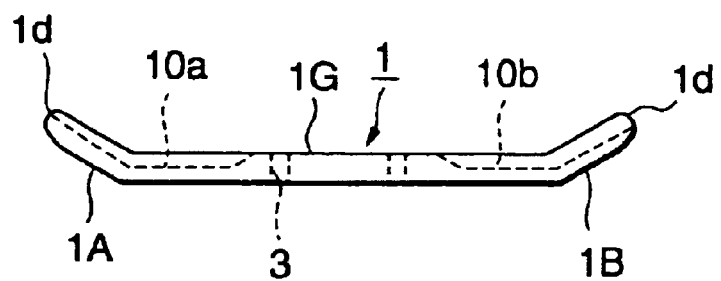
FIG. 8 is a schematic view of a core bar in accordance with a sixth embodiment.

A description will be given of a sixth embodiment of a core bar of an elastic body track shoe on the basis of FIG. 8 with reference to FIG. 1. FIG. 8 is a side elevational view of the core bar. The same recess portions 10a and 10b open toward the front end portions 1d and 1d as those of the third embodiment are respectively formed in the left and right wing portions 1A and 1B of the core bar 1 which are formed in a substantially flat surface in both of front and back surfaces.

In accordance with the present embodiment, in the same manner as the third embodiment, it is possible to lighten the core bar, it is possible to reduce a manufacturing cost, and it is possible to improve a durability.

Figure 9:
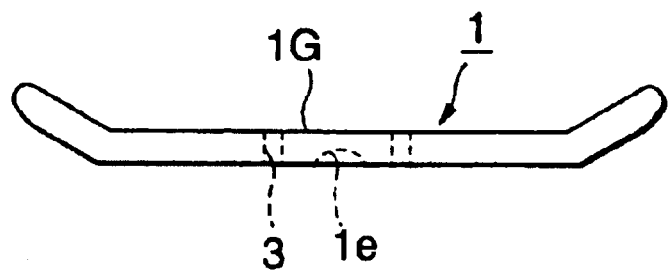
FIG. 9 is a schematic view of a core bar in accordance with a seventh embodiment.

A description will be given of a seventh embodiment of a core bar of an elastic body track shoe on the basis of FIG. 9 with reference to FIG. 1. FIG. 9 is a side elevational view of the core bar. The same recess portion 1e as that of the first embodiment is formed in the grounded surface side or the center portion 1G of the core bar 1 which are formed in a substantially flat surface in both of front and back surfaces. In this case, the recess portion 1e may be formed in the non-grounded surface side of the center portion 10G of the core bar 10.

In accordance with the present embodiment, in the same manner as the first embodiment, it is possible to lighten the core bar, it is possible to reduce a manufacturing cost, and it is possible to improve a durability.

Figure 10:
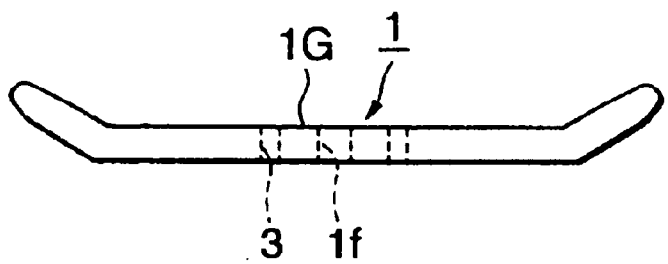
FIG. 10 is a schematic view of a core bar in accordance with an eighth embodiment.
Figure 11:
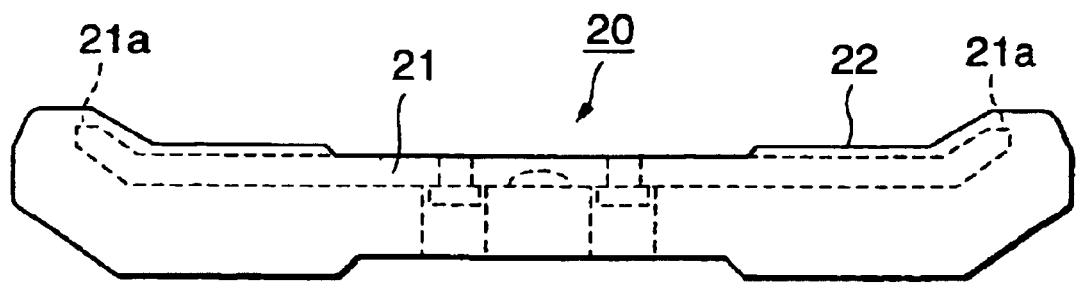
FIG. 11 is a schematic view of an elastic body track shoe in accordance with a first prior art.
Figure 12:
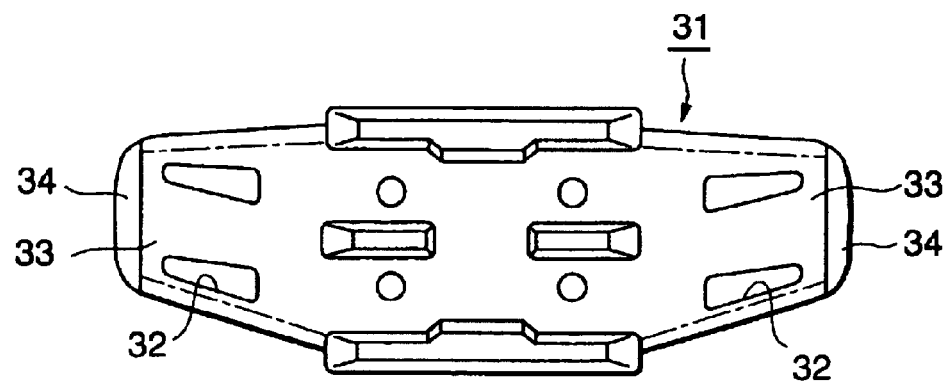
FIG. 12 is a plan view of an inner side of a core bar in accordance with a second prior art.
Figure 13:
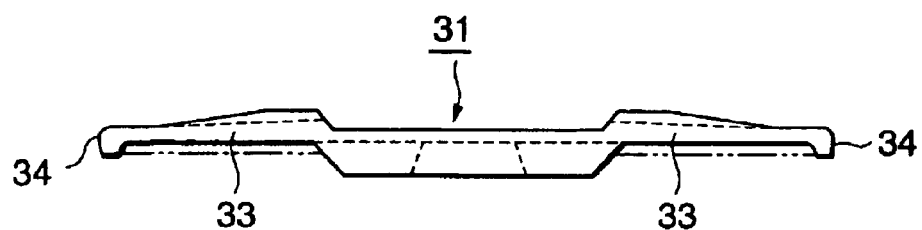
FIG. 13 is a front elevational view of the core bar shown in FIG. 12.

A description will be given of an eighth embodiment of a core bar of an elastic body track shoe on the basis of FIG. 10 with reference to FIG. 1. FIG. 10 is a side elevational view of the core bar 1. The same through hole 1f as that of the second embodiment is formed in the center portion 1G of the core bar 1 which are formed in a substantially flat surface in both of front and back surfaces.

In accordance with the present embodiment, in the same manner as the second embodiment, it is possible to lighten the core bar, it is possible to reduce a manufacturing cost, it is possible to improve a durability, and it is possible to further improve a durability of the elastic body track shoe by the through hole 1f.

As described above, in accordance with the core bar of the elastic body track shoe of the present invention, since the recess portions are formed in the non-grounded sides of the left and right wing portions of the core bar which has an excess strength with respect to the external load applied to the crawler, or the recess portion of the through hole is formed in the center portion of the core bar, it is possible to reduce a cost due to a light structure of the core bar, and it is possible to improve a durability with avoiding a stress concentration in the core bar. Further, since the earth and sands are discharged from the through hole by forming the through hole in the center portion of the core bar, it is possible to prevent the elastic body track shoe from being deteriorated by the earth and sands.

It goes without saying that the present invention has varied application to all the elastic body track shoes formed by combining the recess portions and the through holes for the purpose of making the core bar light, in addition to the first to eighth embodiments mentioned above.

What is claimed is:

1. A core bar of an elastic body track shoe having a ground-contacting surface and a non-ground-contacting surface which define a core bar thickness, arranged in an elastic body in the elastic body track shoe, fastened to each pair of joint links of a crawler by bolts and formed with a substantially flat surface shape on both a ground-containing surface side and a non-pound-contacting surface side, the core bar having an end portion toward the non-around-contacting surface in relation to a width direction of the track shoe, wherein recess portions in a substantially inverse-trapezoidal shape open toward the end portion are formed in a right and a left wing portion of the non-ground-contacting surface side, said recess portions being surrounded on three sides by outer peripheral non-recessed portions having the core bar thickness.

* * * * *